(12) United States Patent
Stragapede

(10) Patent No.: US 6,874,993 B2
(45) Date of Patent: Apr. 5, 2005

(54) METHOD FOR CONTROLLING AN ELECTRIC PUMP

(75) Inventor: Nicola Stragapede, Venaria (IT)

(73) Assignee: Magneti Marelli Powertrain S.p.A. (IT)

( * ) Notice: Subject to any disclaimer, the term of this patent is extended or adjusted under 35 U.S.C. 154(b) by 7 days.

(21) Appl. No.: 10/361,834

(22) Filed: Feb. 11, 2003

(65) Prior Publication Data

US 2003/0185686 A1 Oct. 2, 2003

(30) Foreign Application Priority Data

Feb. 15, 2002 (IT) .................................... TO2002A0131

(51) Int. Cl.$^7$ ............................................... F04B 49/06
(52) U.S. Cl. ...................... 417/44.11; 417/53; 417/44.1
(58) Field of Search ............................... 417/44.11, 53, 417/44.1, 41, 223; 477/79, 80, 180

(56) References Cited

U.S. PATENT DOCUMENTS

| | | | | |
|---|---|---|---|---|
| 3,657,934 A | * | 4/1972 | Ito et al. ....................... | 477/61 |
| 4,203,375 A | * | 5/1980 | Miller ........................... | 74/335 |
| 5,836,207 A | * | 11/1998 | Spooner et al. ............... | 74/335 |
| 6,151,544 A | * | 11/2000 | Amisano et al. .............. | 701/67 |
| 6,262,556 B1 | * | 7/2001 | Hubbard et al. ............. | 318/798 |
| 6,386,170 B1 | * | 5/2002 | Iwano et al. ............. | 123/196 R |
| 6,424,903 B1 | * | 7/2002 | Amisano et al. .............. | 701/67 |

FOREIGN PATENT DOCUMENTS

| | | |
|---|---|---|
| DE | 10028074 | 5/2001 |
| DE | 10028074 A1 * | 5/2001 |
| DE | 10162973 | 8/2002 |

OTHER PUBLICATIONS

Nakamori et al. (US 2002/0091034), published Jul. 11, 2002.*

EPO Search Report, 6/2003.

* cited by examiner

*Primary Examiner*—Charles G. Freay
(74) *Attorney, Agent, or Firm*—Hall, Myers, Vande Sande & Pequignot

(57) ABSTRACT

A control method for an electric pump adapted to supply pressurised operating fluid to actuators of an automatic transmission in order to cause the opening/closing of the clutch and the selection and engagement of the gears, in which the stage of supply of a voltage to the motor of the electric pump is carried out in order to cause the electric pump to rotate. The method comprises the stage of regulating the supply voltage as a function of actual operating conditions monitored in the vehicle using the automatic transmission.

11 Claims, 2 Drawing Sheets

US 6,874,993 B2

METHOD FOR CONTROLLING AN ELECTRIC PUMP

The present invention relates to a control method for an electric pump adapted to provide pressurised operating fluid for an automatic transmission.

BACKGROUND OF THE INVENTION

Automatic transmissions for vehicles are known in which an electronic control unit generates signals for the control of a plurality of actuators of hydraulic type coupled to a clutch and to a gear change and used to bring about the selection and engagement/disengagement of the gears and the opening/closing of the clutch.

Known automatic transmissions are provided with an electric pump which is adapted to pressurise, in a hydraulic circuit, an operating fluid (oil) which is then supplied to the actuators in order to provide the power needed to open/close the clutch and select and engage the gears.

It is also known that in automatic transmissions of known type there is no control of the speed of rotation of the electric pump; for this reason, in some operating conditions, the noise generated by the electric pump during its operation may be particularly intense and perceptible to the driver and/or the other vehicle passengers. For instance, in all the situations in which the noise generated by other members of the vehicle is low, the noise of the electric pump may be particularly unpleasant for the driver.

A number of solutions have been proposed to resolve the above-mentioned drawback, including:

using a pump characterised by internal members with very precise geometries;
using special materials for the connection joint between the electric motor and the pump;
installing housings of sound-absorbing material in the vehicle to cover the pump;
using supports of the "silent-block" type to secure the pump body to the vehicle frame.

The proposed solutions, although not completely resolving the noise problem, introduce further component members and entail an increase in costs.

SUMMARY OF THE INVENTION

The object of the present invention is to provide a control method for the electric pump which resolves, in a simple manner and at a limited cost, the drawbacks of automatic transmissions of known type.

This object is achieved by the present invention which relates to a control method for an electric pump adapted to supply pressurised operating fluid to at least one actuator of an automatic transmission in order to cause the opening/closing of the clutch and/or the selection and engagement of the gears, in which the stage of supply of a voltage to the motor of the electric pump is carried out in order to cause the electric pump to rotate, characterised in that it comprises the stage of regulating this voltage as a function of actual operating conditions monitored in the vehicle using the automatic transmission.

In this way, the speed of rotation of the electric pump is regulated as a function of the operating condition detected at that moment in the vehicle. It is therefore possible to carry out a speed control and reduce this speed and therefore the noise of the electric pump when it may be perceptible to the driver.

BRIEF DESCRIPTION OF THE DRAWINGS

The invention will be described below with particular reference to the accompanying drawings, which show a preferred embodiment thereof, and in which.

DETAILED DESCRIPTION OF THE INVENTION

Figure 1:
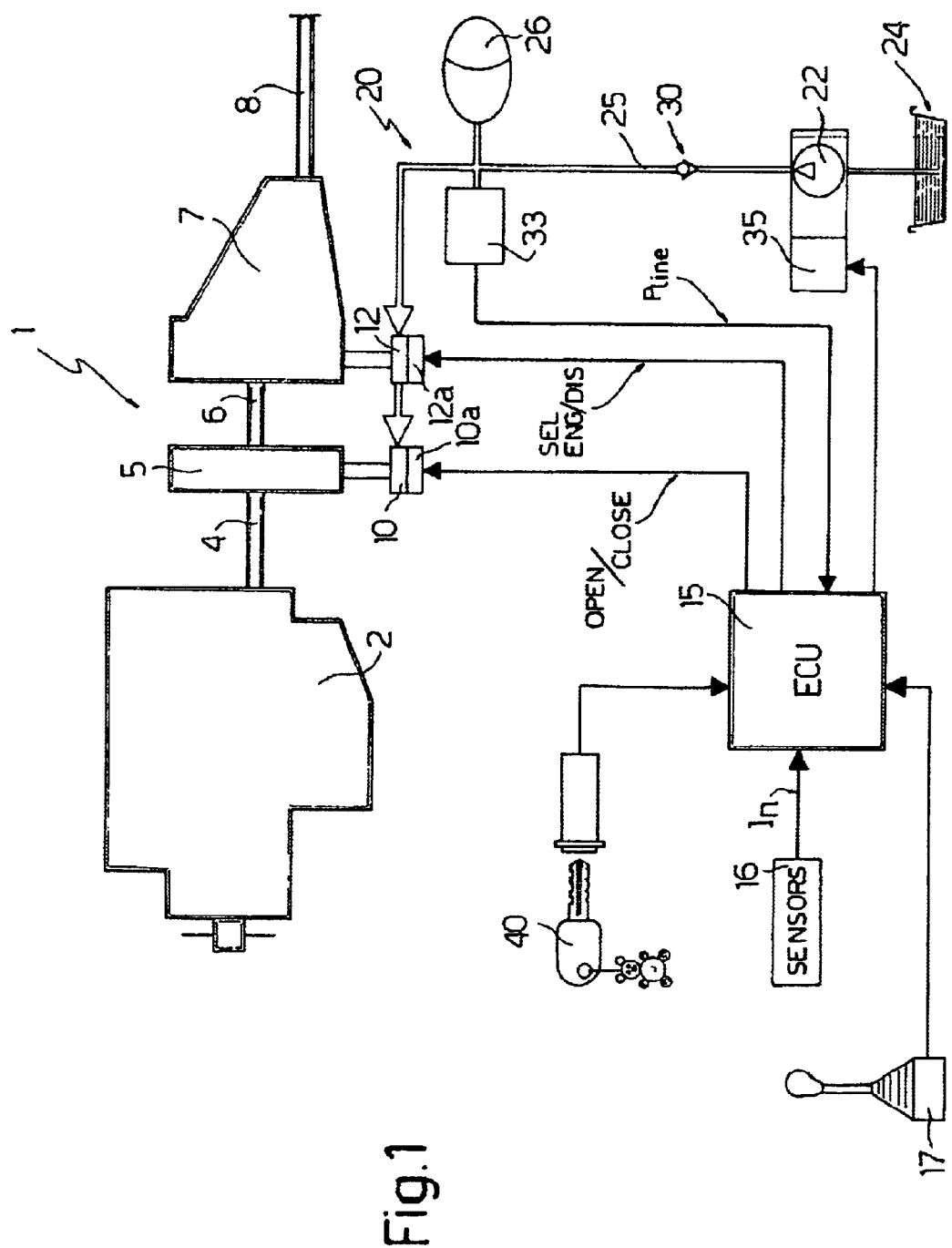
FIG. 1 is a diagrammatic view of an automatic transmission of a motor vehicle operating according to the method of the present invention.

In FIG. 1, an automatic transmission (also known as a "robot" transmission) of a motor vehicle (which may be of any type and is not shown for ease of description) is shown overall by 1.

The engine 2, in particular an internal combustion engine, has an output shaft 4 connected, by means of the interposition of a clutch 5, to the input shaft 6 of a gear change 7 having an output shaft 8 communicating, via a transmission (not shown), with the wheels of the vehicle (not shown).

The clutch 5 is coupled to a first actuator unit 10 (of known type), in particular an actuator unit actuated hydraulically by means of pressurised oil, in order to cause the opening and closing of the clutch 5. The first actuator unit 10 comprises a power unit 10a which receives drive signals OPEN/CLOSE for the opening and closing of the clutch 5.

The gear change 7 is coupled to a second actuator unit 12 (of known type), in particular an actuator unit actuated hydraulically by means of pressurised oil, in order to carry out the operations of gear selection and engagement/disengagement of the gears selected.

The second actuator unit 12 comprises a power unit 12a which receives drive signals SEL for the selection of the rank of gears and control signal's ENG/DIS for the engagement/disengagement of the gear selected.

The automatic transmission 1 comprises an electronic control unit (ECU) 15 which receives a plurality of information signals In and generates as output the above-mentioned drive signals OPEN/CLOSE for the opening or closing of the clutch 5 and SEL, ENG/DIS for the selection and engagement/disengagement of the gears in the gear change 7.

In particular, the electronic control unit receives as input a plurality of information signals In measured by sensors 16 and connected with the operation of the engine 2 (speed of rotation of the engine, quantity of fuel injected into the engine, torque supplied, etc.), the operation of the gear change 7 and the course of the vehicle (vehicle speed, accelerator position, etc.).

The electronic unit 15 also receives control signals generated by a device 17 that can be manually actuated by an operator (not shown) to control the selection of the different gears. For instance, the device 17 may be of a sequential type and used to control a unit increase (UP-SHIFT) of the gear engaged and a unit decrease (DOWN-SHIFT) of the gear engaged. The electronic control unit 15 also receives control signals generated by an ignition device 40 (ignition key) that can be manually actuated by an operator (not shown) for the ignition/cut-off of the electronic control unit 15.

The automatic transmission 1 comprises a device for the generation of pressurised operating fluid (oil) 20 which comprises an electric pump 22 which receives as input operating fluid (oil) from a tank 24 (shown diagrammatically) and supplies as output pressurised operating fluid to a supply line 25. The supply line 25 communicates with the first and the second actuator unit 10 and 12, supplying them with the pressurised oil in order to open/ close the clutch and/or select and engage the gears. The pressurised fluid supply line 25 communicates with an operating fluid tank 26 (of known type); moreover, a non-return valve 30 is disposed between the outlet of the electric pump 22 and the inlet of the tank 26.

A pressure sensor 33 detects the pressure Pline in the supply line 25 and supplies the information associated with this pressure Pline to the electronic control unit 15. The information on the line pressure Pline is used to control the starting/stopping of the electric pump 22; in particular, the electric pump 22 is actuated when the pressure Pline detected drops below a lower threshold and is stopped when the pressure Pline detected exceeds an upper threshold.

According to the present invention, the electric pump 22 is controlled by a smart drive circuit 35 which communicates with the electronic control unit 15 and is adapted to control the speed of rotation of the electric pump 22 as a function of the actual operating conditions monitored in the vehicle using the automatic transmission 1.

In particular, the speed control of the electric pump 22 is obtained by varying the actual value Veff of the supply voltage supplied to the motor (not shown) of the electric pump 22 between a minimum value Vmin (conveniently Vmin is slightly above 0) and a maximum value Vmax (conveniently Vmax=Vbatt, where Vbatt is the voltage supplied by the vehicle battery).

Figure 2:
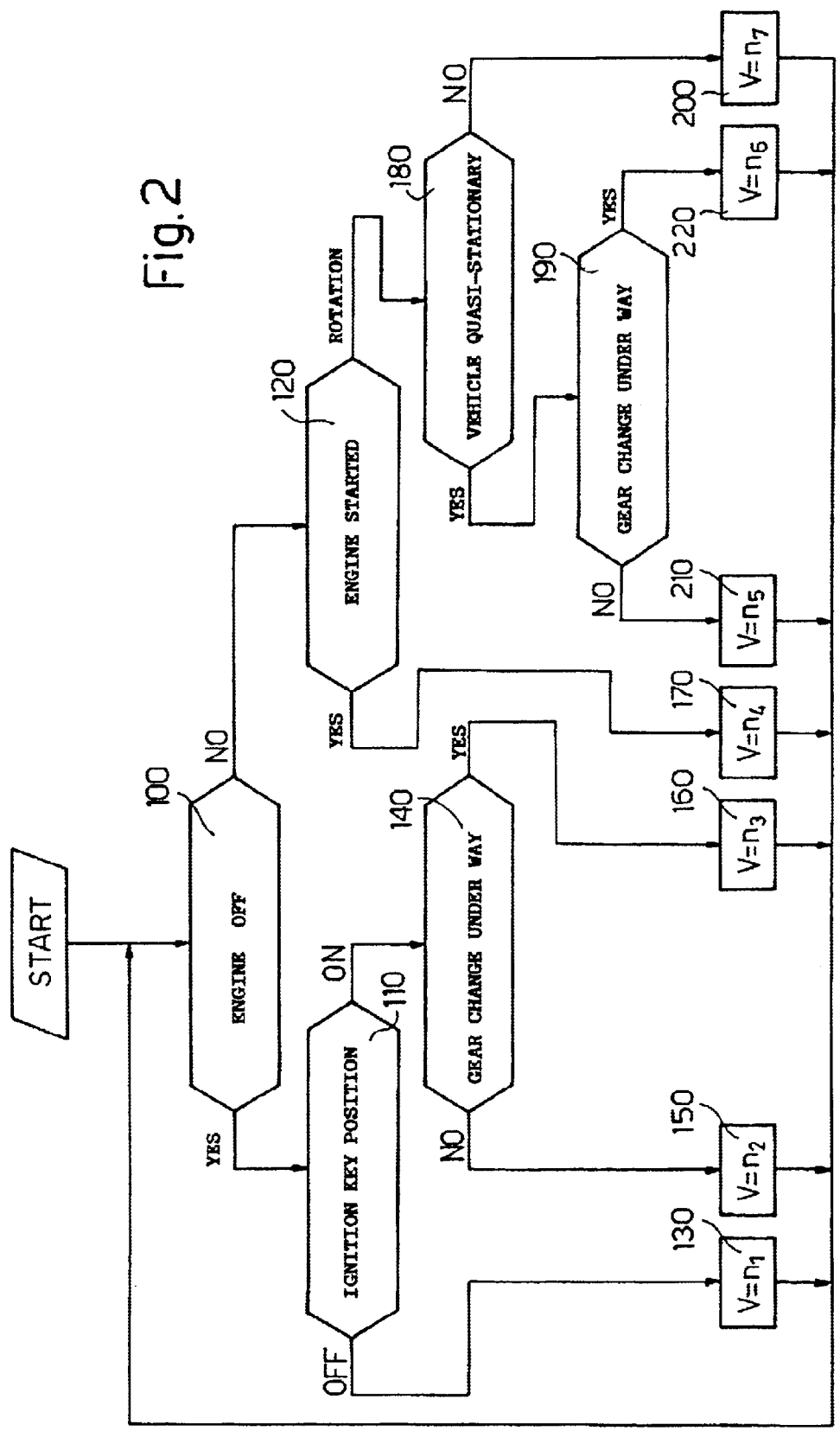
FIG. 2 shows, in a block diagram, the operations of the method of the present invention.

FIG. 2 shows the operations performed by the electronic control unit 15 together with the smart drive circuit 35 for the regulation of the speed of rotation of the electric pump 22.

In the first block 100, it is checked whether the engine 2 is off; if so (engine 2 off), the block 100 is followed by a block 110 and if not (engine 2 on) the block 100 is followed by a block 120.

The block 110 checks the position of the vehicle ignition key 40; in particular, if the ignition key 40 is disposed in a first position (OFF) in which the engine and the electronic unit 15 are not being supplied as normal, the block 110 is followed by a block 130 which controls the supply of the motor of the electric pump 22 with a first voltage $V_1$ which achieves a speed of rotation $n_1$ of the electric pump 22.

If, however, the ignition key 40 is disposed in a second position (ON) in which the engine 2 and the electronic unit 15 are being supplied, the block 110 is followed by a block 140 which checks whether a gear change operation is under way.

When the block 140 does not detect that a gear change operation is under way, the block 140 is followed by a block 150 which controls the supply of the motor of the electric pump 22 with a second voltage $V_2$ which achieves a second speed of rotation $n_2$ of the electric pump 22. When, however, the block 140 detects that a gear change is under way, the block 140 is followed by a block 160 which controls the supply of the motor of the electric pump 22 with a third voltage $V_3$ which achieves a third speed of rotation $n_3$ of the electric pump 22.

The block 120 detects whether the engine 2 is in the ignition stage; if so (engine 2 in the ignition stage), the block 120 is followed by a block 170 which controls the supply of the motor of the electric pump 22 with a fourth voltage $V_4$ which achieves a fourth speed of rotation $n_4$ of the electric pump 22.

When the engine 2 is not in the ignition stage (and is therefore already in motion), the block 120 is followed by a block 180 which checks whether the vehicle is quasi-stationary, i.e. if the speed of the vehicle is below a threshold; if so (vehicle stationary or travelling at low speed), the block 180 is followed by a block 190 and if not (vehicle travelling at a speed above the threshold), the block 180 is followed by a block 200.

The block 190 checks whether a gear change operation is under way.

When a gear change operation has not been detected, the block 190 is followed by a block 210 which controls the supply of the motor of the electric pump 22 with a fifth voltage $V_5$ which achieves a fifth speed of rotation $n_5$ of the electric pump 22. When, however, the block 190 detects that a gear change is under way, the block 190 is followed by a block 220 which controls the supply of the motor of the electric pump 22 with a sixth voltage $V_6$ which achieves a sixth speed of rotation $n_6$ of the electric pump 22.

The block 200 controls the supply of the motor of the electric pump 22 with a seventh voltage $V_7$ which achieves a seventh speed of rotation $n_7$ of the electric pump 22.

There is a return to the block 100 after the blocks 130, 150, 160, 170, 210, 220 and 200.

It will be appreciated that the supply voltages provided are related to one another with the ratio:

$$V_7 > V_6 > V_5 > V_4 > V_3 > V_2 > V_1.$$

Preferably, but not exclusively, $V_7 = V_{batt}$ and $V_1 = V_{min}$ of slightly above zero such that the speeds achieved are of the type:

$$n_7 > n_6 > n_5 > n_4 > n_3 > n_2 > n_1.$$

In this way, the electric pump is supplied with a low voltage (and rotates at a low speed) when the engine is off and therefore the noise generated by the electric pump is more perceptible, while the electric pump is supplied with a voltage close to the maximum voltage (and rotates at high speed) when the engine is on and therefore the noise generated by the electric pump is less perceptible.

Moreover, when a gear change is under way (blocks 140 and 190), the speed of rotation of the electric pump is increased in order to supply greater hydraulic power.

In this way, the electric pump 22 is supplied by a voltage regulator which provides different voltages ($V_1$, $V_2$, $V_3$, $V_4$, $V_5$, $V_6$ and $V_7$) so as to obtain respective different speeds of rotation ($n_1$, $n_2$, $n_3$, $n_4$, $n_5$, $n_6$ and $n_7$), each of which is associated with a particular operating situation detected in the vehicle.

The operating situations detected and the respective speeds implemented are as follows:
engine 2 off (block 100—YES) and vehicle key in OFF position (block 110—OFF): the speed of rotation of the electric pump 22 is controlled to the predetermined value $n_1$ (block 130);
engine 2 off (block 100—YES), vehicle key in ON position (block 110—ON) and no gear change operation taking place (block 140—NO): the speed of rotation of the electric pump is controlled to the predetermined value $n_2$ (block 150);
engine 2 off (block 100—YES), vehicle key in ON position (block 110—ON) and gear change under way (block 140—YES): the speed of rotation of the electric pump is controlled to the predetermined value $n_3$ (block 160);
engine 2 at ignition stage (block 120—YES): the speed of rotation of the electric pump is controlled to the predetermined value $n_4$ (block 170);
engine 2 in rotation at a speed close to idling, vehicle quasi-stationary (block 180—YES) and no gear change operation under way (block 190—NO): the speed of rotation of the electric pump is controlled to the predetermined value $n_5$;

engine 2 in rotation at a speed close to idling, vehicle quasi-stationary and gear change under way (block 190—YES): the speed of rotation of the electric pump is controlled to the predetermined value $n_6$ (block 220).

The speed of rotation implemented by means of the operations of FIG. 2 may be subject to correction operations; in particular, when the engine 2 is in rotation at a speed close to idling and the vehicle windows are open, the speed of rotation calculated may be reduced by a percentage value (for instance 20%) with respect to the value set by the blocks 130, 150, 160, 170, 210, 220 or 200.

When, however, the temperature of the electric pump (measured or estimated) is greater than a predetermined threshold, the speed of rotation of the electric pump may be increased (for example by 20%) with respect to the value provided and set by the blocks 130, 150, 160, 170, 210, 220 or 200.

Lastly, during the initial stage of actuation of the electric pump, the speed to which it is set may be increased gradually, in a predetermined time interval, from a zero value to the speed value provided for the specific operating situation and calculated by the blocks 130, 150, 160, 170, 210, 220 or 200. This provides a further advantage since the gradual increase of the voltage applied to the electric pump prevents the formation of the current peak that may be generated in automatic transmissions of known type in the initial instants of actuation of the electric pump.

This prevents any disturbance of other electrical systems installed on board the vehicle (it is known, for instance, that the current peak may cause the phenomenon of flickering of the vehicle lights). In this way it is possible to eliminate the initial current peak without substantially delaying the supply of a flow of hydraulic oil.

It will be appreciated from the above that the present invention helps to reduce the electric pump noise to a level appropriate to the operating situation (engine off, engine idling, vehicle quasi-stationary, windows open, etc.) of the system.

This noise reduction is obtained without acoustically insulating the electric pump, i.e. with an evident saving of costs arising from acoustic insulation. It is therefore possible to use less costly electric pumps that do not have to guarantee very restrictive maximum noise levels.

The present invention also makes it possible to limit disturbances of the electrical plant of the vehicle caused by the pump actuation stages.

It will lastly be appreciated that modifications and variations may be made to the above description without thereby departing from the scope of protection of the present invention.

What is claimed is:

1. A method for controlling the electric pump (22) of an engine of a vehicle said engine being comprised of a clutch, gears and a motor, said pump adapted to supply pressurised operating fluid to at least one actuator (10, 12) of an automatic robot transmission (1) comprised of said clutch and gears in order to cause the opening/closing of the clutch and/or the selection and engagement of the gears, in which the voltage supplied to the electric pump is carried out in order to cause the electric pump to rotate, characterised in that it comprises the step of regulating said voltage as a function of a different operating condition monitored in the vehicle during which a different voltage is generated ($V_1$, $V_2$, $V_3$, $V_4$, $V_5$, $V_6$ and $V_7$) for the motor of the electric pump so as to obtain respective different speeds of rotation ($n_1, n_2, n_3, n_4, n_5, n_6$ and $n_7$), each said different voltage being selected in conjunction with a respective operating situation detected in the vehicle.

2. A method as claimed in claim 1, which a first operating situation is detected in which the engine (2) of the vehicle is off (100) and there is no engine supply signal (110), the speed of rotation of the electric pump (22) being set to a first predetermined value ($n_1$) in the presence of this first operating situation.

3. A method as claimed in claim 1, in which an operating situation is detected in which the engine (2) of the vehicle is off (100), there is an engine supply signal (110) and no gear change operation is under way, the speed of rotation of the electric pump (22) being set to a second predetermined value ($n_2$) in the presence of this second operating situation.

4. A method as claimed in claim 1, in which an operating situation is detected in which the engine (2) of the vehicle is off (100), there is an engine supply signal (110) and a gear change operation is under way, the speed of rotation of the electric pump (22) being set to a third predetermined value ($n_3$) in the presence of this said operating situation.

5. A method as claimed in claim 1, in which an operating situation is detected in which the engine (2) of the vehicle is at an ignition stage (120), the speed of rotation of the electric pump (22) being set to a fourth predetermined value ($n_4$) in the presence of said operating situation.

6. A method as claimed in claim 1, in which an operating situation is detected in which the engine (2) of the vehicle is in motion (120), the vehicle is travelling at a speed lower than a threshold and no gear change operation is under way, the speed of rotation of the electric pump (22) being set to a fifth predetermined value ($n_5$) in the presence of said operating situation.

7. A method as claimed in claim 1, in which an operating situation is detected in which the engine (2) of the vehicle is in motion (120), the vehicle is travelling at a speed lower than a threshold and a gear change operation is under way, the speed of rotation of the electric pump (22) being set to a sixth predetermined value ($n_6$) in the presence of said operating situation.

8. A method as claimed in claim 1, in which a correction stage is carried out in which a set speed of rotation is modified as a function of further operating parameters that are detected.

9. A method as claimed in claim 8, in which the correction stage comprises a stage of reducing the speed of rotation with respect to the set value (130, 150, 170, 170, 210, 220, 200) when the engine (2) is in rotation at a speed lower than a threshold and the vehicle windows are open.

10. A method as claimed in claim 8, in which the correction stage comprises the stage of increasing the speed of rotation with respect to a set value (130, 150, 170, 170, 210, 220, 200) when the temperature of the electric pump is greater than a predetermined threshold.

11. A method as claimed in claim 8, in which the correction stage comprises a stage of gradually increasing, over a predetermined time interval, the speed of rotation from an initial value of zero to the speed value provided for a particular operating situation.

* * * * *